(12) United States Patent
Liken et al.

(10) Patent No.: US 9,619,720 B2
(45) Date of Patent: Apr. 11, 2017

(54) VEHICLE IMAGING SYSTEM AND METHOD FOR DISTINGUISHING BETWEEN VEHICLE TAIL LIGHTS AND FLASHING RED STOP LIGHTS

(71) Applicant: Gentex Corporation, Zeeland, MI (US)

(72) Inventors: Peter A Liken, West Olive, MI (US); Phillip R Pierce, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/462,674

(22) Filed: Aug. 19, 2014

(65) Prior Publication Data

US 2015/0049197 A1 Feb. 19, 2015

Related U.S. Application Data

(60) Provisional application No. 61/867,216, filed on Aug. 19, 2013.

(51) Int. Cl.
*G06K 9/62* (2006.01)
*H04N 7/18* (2006.01)
*G06K 9/00* (2006.01)

(52) U.S. Cl.
CPC ................ *G06K 9/00825* (2013.01)

(58) Field of Classification Search
CPC .............. B60Q 2300/3321; G06K 9/00825
See application file for complete search history.

(56) References Cited

U.S. PATENT DOCUMENTS 2,131,888 A 10/1938 Harris
2,632,040 A 3/1953 Rabinow
(Continued)

FOREIGN PATENT DOCUMENTS

DE 2946561 5/1981
EP 1504957 A2 9/2005
(Continued)

OTHER PUBLICATIONS

Christopher M. Kormanyos, "SAE Paper No. 980003 entitled "HID System with Adaptive Vertical AIM Control"," p. 13-18.
(Continued)

*Primary Examiner* — Neil Mikeska
(74) *Attorney, Agent, or Firm* — Price Heneveld LLP; Bradley D. Johnson (57) ABSTRACT

An imaging system for a vehicle is provided for distinguishing between tail lights of another vehicle and a flashing red stop light. The system includes an imager configured to image a forward external scene and to generate image data corresponding to the acquired images; and a processor configured to receive and analyze the image data to identify red light sources and to further analyze each red light source to determine if the red light source is detected for a predetermined time period. If the red light source is not detected within a predetermined time period after it is detected, the processor determines that the red light source is a flashing red stop light. Otherwise, if the red light source is detected for a predetermined time period, the processor determines that the red light source may be a tail light of another vehicle.

19 Claims, 4 Drawing Sheets

(56) References Cited

U.S. PATENT DOCUMENTS

| | | |
|---|---|---|
| 2,827,594 A | 3/1958 | Rabinow |
| 3,179,845 A | 4/1965 | Kulwiec |
| 3,581,276 A | 5/1971 | Newman |
| 3,663,819 A | 5/1972 | Hicks et al. |
| 4,139,801 A | 2/1979 | Linares |
| 4,151,526 A | 4/1979 | Hinachi et al. |
| 4,236,099 A | 11/1980 | Rosenblum |
| 4,258,979 A | 3/1981 | Mahin |
| 4,286,308 A | 8/1981 | Wolff |
| 4,357,558 A | 11/1982 | Massoni et al. |
| 4,376,909 A | 3/1983 | Tagami et al. |
| 4,479,173 A | 10/1984 | Rumpakis |
| 4,599,544 A | 7/1986 | Martin |
| 4,645,975 A | 2/1987 | Meitzler et al. |
| 4,665,321 A | 5/1987 | Chang et al. |
| 4,692,798 A | 9/1987 | Seko et al. |
| 4,716,298 A | 12/1987 | Etoh |
| 4,727,290 A | 2/1988 | Smith et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,930,742 A | 6/1990 | Schofield et al. |
| 4,934,273 A | 6/1990 | Endriz |
| 4,967,319 A | 10/1990 | Seko |
| 5,008,946 A | 4/1991 | Ando |
| 5,036,437 A | 7/1991 | Macks |
| 5,072,154 A | 12/1991 | Chen |
| 5,086,253 A | 2/1992 | Lawler |
| 5,096,287 A | 3/1992 | Kakinami et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,235,178 A | 8/1993 | Hegyi |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,396,054 A | 3/1995 | Krichever et al. |
| 5,402,170 A | 3/1995 | Parulski et al. |
| 5,416,318 A | 5/1995 | Hegyi |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,471,515 A | 11/1995 | Fossum et al. |
| 5,475,441 A | 12/1995 | Parulski et al. |
| 5,481,268 A | 1/1996 | Higgins |
| 5,483,346 A | 1/1996 | Butzer |
| 5,485,155 A | 1/1996 | Hibino |
| 5,508,592 A | 4/1996 | Lapatovich et al. |
| 5,537,003 A | 7/1996 | Bechtel et al. |
| 5,541,724 A | 7/1996 | Hoashi |
| 5,550,677 A | 8/1996 | Schofield et al. |
| 5,554,912 A | 9/1996 | Thayer et al. |
| 5,574,463 A | 11/1996 | Shirai et al. |
| 5,587,929 A | 12/1996 | League et al. |
| 5,592,146 A | 1/1997 | Kover, Jr. |
| 5,614,788 A | 3/1997 | Mullins et al. |
| 5,621,460 A | 4/1997 | Hatlestad et al. |
| 5,660,454 A | 8/1997 | Mori et al. |
| 5,666,028 A | 9/1997 | Bechtel et al. |
| 5,684,473 A | 11/1997 | Hibino et al. |
| 5,707,129 A | 1/1998 | Kobayashi |
| 5,710,565 A | 1/1998 | Shirai et al. |
| 5,714,751 A | 2/1998 | Chen |
| 5,715,093 A | 2/1998 | Schierbeek et al. |
| 5,736,816 A | 4/1998 | Strenke et al. |
| 5,751,832 A | 5/1998 | Panter et al. |
| 5,781,105 A | 7/1998 | Bitar et al. |
| 5,786,787 A | 7/1998 | Eriksson et al. |
| 5,796,094 A | 8/1998 | Schofield et al. |
| 5,798,727 A | 8/1998 | Shirai et al. |
| 5,811,888 A | 9/1998 | Hsieh |
| 5,812,321 A | 9/1998 | Schierbeek et al. |
| 5,835,613 A | 11/1998 | Breed et al. |
| 5,837,994 A | 11/1998 | Stam et al. |
| 5,841,126 A | 11/1998 | Fossum et al. |
| 5,845,000 A | 12/1998 | Breed et al. |
| 5,867,214 A | 2/1999 | Anderson et al. |
| 5,877,897 A | 3/1999 | Schofield et al. |
| 5,905,457 A | 5/1999 | Rashid |
| 5,912,534 A | 6/1999 | Benedict |
| 5,923,027 A | 7/1999 | Stam et al. |
| 5,942,853 A | 8/1999 | Piscart |
| 5,990,469 A | 11/1999 | Bechtel et al. |
| 6,008,486 A | 12/1999 | Stam et al. |
| 6,018,308 A | 1/2000 | Shirai |
| 6,049,171 A | 4/2000 | Stam et al. |
| 6,097,023 A | 8/2000 | Schofield et al. |
| 6,102,546 A | 8/2000 | Carter |
| 6,130,421 A | 10/2000 | Bechtel et al. |
| 6,130,448 A | 10/2000 | Bauer et al. |
| 6,140,933 A | 10/2000 | Bugno et al. |
| 6,144,158 A | 11/2000 | Beam |
| 6,166,698 A | 12/2000 | Turnbull et al. |
| 6,184,781 B1 | 2/2001 | Ramakesavan |
| 6,255,639 B1 | 7/2001 | Stam et al. |
| 6,281,632 B1 | 8/2001 | Stam et al. |
| 6,329,925 B1 | 12/2001 | Skiver et al. |
| 6,349,782 B1 | 2/2002 | Sekiya et al. |
| 6,356,376 B1 | 3/2002 | Tonar et al. |
| 6,379,013 B1 | 4/2002 | Bechtel et al. |
| 6,396,040 B1 | 5/2002 | Hill |
| 6,396,397 B1 | 5/2002 | Bos et al. |
| 6,403,942 B1 | 6/2002 | Stam |
| 6,429,594 B1 | 8/2002 | Stam et al. |
| 6,442,465 B2 | 8/2002 | Breed et al. |
| 6,443,602 B1 | 9/2002 | Tanabe et al. |
| 6,465,962 B1 | 10/2002 | Fu et al. |
| 6,469,739 B1 | 10/2002 | Bechtel et al. |
| 6,483,438 B2 | 11/2002 | DeLine et al. |
| 6,491,416 B1 | 12/2002 | Strazzanti |
| 6,507,779 B2 | 1/2003 | Breed et al. |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,435 B2 | 5/2003 | Schofield et al. |
| 6,587,573 B1 | 7/2003 | Stam et al. |
| 6,593,698 B2 | 7/2003 | Stam et al. |
| 6,611,610 B1 | 8/2003 | Stam et al. |
| 6,617,564 B2 | 9/2003 | Ockerse et al. |
| 6,631,316 B2 | 10/2003 | Stam et al. |
| 6,677,986 B1 | 1/2004 | Pöchmüller |
| 6,728,393 B2 | 4/2004 | Stam et al. |
| 6,772,057 B2 | 8/2004 | Breed et al. |
| 6,774,988 B2 | 8/2004 | Stam et al. |
| 6,824,281 B2 | 11/2004 | Schofield et al. |
| 6,861,809 B2 | 3/2005 | Stam |
| 6,902,307 B2 | 6/2005 | Strazzanti |
| 6,913,375 B2 | 7/2005 | Strazzanti |
| 6,928,180 B2 | 8/2005 | Stam et al. |
| 6,946,978 B2 | 9/2005 | Schofield |
| 6,999,004 B2 | 2/2006 | Comaniciu et al. |
| 7,012,543 B2 | 3/2006 | Deline et al. |
| 7,038,577 B2 | 5/2006 | Pawlicki et al. |
| 7,049,945 B2 | 5/2006 | Breed et al. |
| 7,255,465 B2 | 8/2007 | Deline et al. |
| 7,262,406 B2 | 8/2007 | Heslin et al. |
| 7,265,342 B2 | 9/2007 | Heslin et al. |
| 7,311,428 B2 | 12/2007 | Deline et al. |
| 7,321,112 B2 | 1/2008 | Stam et al. |
| 7,365,769 B1 * | 4/2008 | Mager ............... B60Q 1/44 340/467 |
| 7,417,221 B2 | 8/2008 | Creswick et al. |
| 7,446,650 B2 | 11/2008 | Schofield et al. |
| 7,467,883 B2 | 12/2008 | Deline et al. |
| 7,468,651 B2 | 12/2008 | Deline et al. |
| 7,526,103 B2 | 4/2009 | Schofield et al. |
| 7,533,998 B2 | 5/2009 | Schofield et al. |
| 7,565,006 B2 | 7/2009 | Stam et al. |

(56) References Cited

U.S. PATENT DOCUMENTS

| | | |
|---|---|---|
| 7,567,291 B2 | 7/2009 | Bechtel et al. |
| 7,575,348 B2 | 8/2009 | Hasegawa |
| 7,653,215 B2 | 1/2010 | Stam |
| 7,658,521 B2 | 2/2010 | Deline et al. |
| 7,683,326 B2 | 3/2010 | Stam et al. |
| 7,708,434 B2 | 5/2010 | Moizard et al. |
| 7,719,408 B2 | 5/2010 | Deward et al. |
| 7,720,580 B2 | 5/2010 | Higgins-Luthman |
| 7,815,326 B2 | 10/2010 | Blank et al. |
| 7,877,175 B2 | 1/2011 | Higgins-Luthman |
| 7,881,839 B2 | 2/2011 | Stam et al. |
| 7,888,629 B2 | 2/2011 | Heslin et al. |
| 7,914,188 B2 | 3/2011 | Deline et al. |
| 7,972,045 B2 | 7/2011 | Schofield |
| 7,994,471 B2 | 8/2011 | Heslin et al. |
| 8,045,760 B2 | 10/2011 | Stam et al. |
| 8,063,753 B2 | 11/2011 | Deline et al. |
| 8,090,153 B2 | 1/2012 | Schofield et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,203,443 B2 | 6/2012 | Bos et al. |
| 8,217,830 B2 | 7/2012 | Lynam |
| 8,222,588 B2 | 7/2012 | Schofield et al. |
| 8,258,433 B2 | 9/2012 | Byers et al. |
| 8,289,142 B2 | 10/2012 | Pawlicki et al. |
| 8,289,430 B2 | 10/2012 | Bechtel et al. |
| 8,325,028 B2 | 12/2012 | Schofield et al. |
| 8,492,698 B2 | 7/2013 | Schofield et al. |
| 8,543,254 B1 | 9/2013 | Schut et al. |
| 8,718,899 B2 | 5/2014 | Schwindt et al. |
| 2002/0040962 A1* | 4/2002 | Schofield ............... B60N 2/002 250/208.1 |
| 2003/0202357 A1 | 10/2003 | Strazzanti |
| 2004/0143380 A1* | 7/2004 | Stam ...................... B60Q 1/085 701/36 |
| 2004/0145905 A1 | 7/2004 | Strazzanti |
| 2008/0044062 A1* | 2/2008 | Stam ...................... B60Q 1/085 382/104 |
| 2008/0165028 A1 | 7/2008 | Fechner et al. |
| 2008/0192132 A1 | 8/2008 | Bechtel et al. |
| 2008/0252488 A1* | 10/2008 | Bos ......................... B60N 2/002 340/937 |
| 2008/0294315 A1 | 11/2008 | Breed |
| 2009/0010494 A1* | 1/2009 | Bechtel ................. B60Q 1/1423 382/104 |
| 2011/0135155 A1* | 6/2011 | Kudo .................... G06K 9/2054 382/104 |
| 2012/0072080 A1 | 3/2012 | Jeromin et al. |
| 2012/0176499 A1 | 7/2012 | Winter et al. |
| 2012/0249795 A1* | 10/2012 | Ito ....................... G06K 9/00825 348/148 |
| 2013/0028473 A1 | 1/2013 | Hilldore et al. |
| 2013/0101161 A1* | 4/2013 | Faber ...................... G01J 1/18 382/103 |
| 2013/0229520 A1* | 9/2013 | Aimura ............... G06K 9/00805 348/148 |
| 2013/0253754 A1* | 9/2013 | Ferguson ............. G05D 1/0231 701/28 |
| 2014/0036080 A1* | 2/2014 | Schut ........................ H04N 7/18 348/148 |
| 2014/0132769 A1* | 5/2014 | Kido .................. G06K 9/00791 348/148 |
| 2014/0192190 A1* | 7/2014 | Takahashi ................ G06K 9/00 348/143 |
| 2014/0247351 A1 | 9/2014 | Murillo Amaya et al. |

FOREIGN PATENT DOCUMENTS

| | | |
|---|---|---|
| EP | 2437233 A1 | 4/2012 |
| FR | 2641237 | 7/1990 |
| FR | 2726144 | 4/1996 |
| GB | 2313973 | 12/1997 |
| JP | 5744541 | 3/1982 |
| JP | 6015237 | 1/1985 |
| JP | 62131837 | 6/1987 |
| JP | 01233129 | 9/1989 |
| JP | 5139203 | 6/1993 |
| JP | 5342901 | 12/1993 |
| JP | 06151067 | 5/1994 |
| JP | 06267304 | 9/1994 |
| JP | 6276524 | 9/1994 |
| JP | 6295601 | 10/1994 |
| JP | 6321007 | 11/1994 |
| JP | 732936 | 2/1995 |
| JP | 747878 | 2/1995 |
| JP | 7052706 | 2/1995 |
| JP | 769125 | 3/1995 |
| JP | 8166221 | 6/1996 |
| JP | 08221700 | 8/1996 |
| JP | 2010020483 | 1/2010 |
| WO | 8605147 | 9/1986 |
| WO | 9735743 | 10/1997 |
| WO | 9843850 | 10/1998 |
| WO | 9947396 | 10/1999 |
| WO | 0022881 | 4/2000 |

OTHER PUBLICATIONS

J.P. Lowenau et al, "SAE Paper No. 980007 entitled "Adaptive Light Control—A New Light Concept Controlled by Vehicle Dynamics and Navigation"," p. 33-38.

Franz-Josef Kalze, "SAE Paper No. 980005 entitled "Xenon Light for Main and Dipped Beam"," p. 23-26.

Tohru Shimizu et al, (SAE Paper No. 980322 entitled "Development of PWM DRL with Low RF Emissions and Low Heat", p. 113-117.

International Searching Authority, Patent Cooperation Treaty, International Search Report and Written Opinion, Sep. 12, 2013, 6 pages.

International Searching Authority, Patent Cooperation Treaty, International Search Report and Written Opinion, Dec. 25, 2014, 6 pages.

JP Abstract of Patent No. 60-015237, "Headlight Device," (Jan. 25, 1985).

JP Abstract of Patent No. 01233129 A, "Optical Axis Changing Device for Illuminating Lamp," (Sep. 18, 1989).

JP Abstract of Patent No. 5342901, "Projection headlamp for vehicles," p. 1.

JP Abstract for Patent No. 6321007, "Vehicular Dazzle Sensor," p. 1.

JP Abstract of Patent No. 08221700 A, "Stop Lamp Recognition Device," p. 1.

JP Abstract of Publication No. 2010-020483, "Vehicle Detection Device, Vehicle Detection Program and Light Controller," p. 1.

International Searching Authority, Patent Cooperation Treaty, International Search Report and Written Opinion, Nov. 20, 2014, 6 pages.

Patent Cooperation Treaty, International Searching Authority, International Search Report, Written Opinion of the International Searching Authority and Notification of Transmittal, Nov. 20, 2014, 6 Pages.

\* cited by examiner

VEHICLE IMAGING SYSTEM AND METHOD FOR DISTINGUISHING BETWEEN VEHICLE TAIL LIGHTS AND FLASHING RED STOP LIGHTS

CROSS-REFERENCE TO RELATED APPLICATION

This application claims priority to and the benefit under 35 U.S.C. §119(e) of U.S. Provisional Patent Application No. 61/867,216, filed on Aug. 19, 2013, entitled "SYSTEM AND METHOD FOR CONTROLLING EXTERIOR VEHICLE LIGHTS IN RESPONSE TO FLASHING RED STOP LIGHTS," the entire disclosure of which is hereby incorporated herein by reference.

FIELD OF THE INVENTION

The present invention generally relates to a system and method for imaging and detecting objects in a scene forward of a vehicle.

SUMMARY OF THE INVENTION

According to one aspect of the present invention, an imaging system is provided for a vehicle. The imaging system comprises: an imager configured to image a scene external and forward of the vehicle and to generate image data corresponding to the acquired images; and a processor configured to receive and analyze the image data to identify red light sources and further to analyze each red light source to determine if the red light source is detected for a predetermined time period, wherein if the red light source is not detected within a predetermined time period after it is detected, the processor determines that the red light source is a flashing red stop light, otherwise if the red light source is detected for a predetermined time period, the processor determines that the red light source may be a tail light of another vehicle.

According to another aspect of the present invention, a method is provided for distinguishing between tail lights of another vehicle and a flashing red stop light. The method comprises the steps of: providing an imager for use in a vehicle; imaging a scene external and forward of the vehicle and generating image data corresponding to the acquired images; receiving and analyzing the image data in a processor to identify red light sources and further analyze each red light source to determine if the red light source is detected for a predetermined time period; if the red light source is not detected within a predetermined time period after it is detected, determining that the red light source is a flashing red stop light; and otherwise if the red light source is detected for a predetermined time period, determining that the red light source may be a tail light of another vehicle.

According to another aspect of the present invention, a non-transitory tangible computer readable medium is provided having stored thereon software instructions that, when executed by a processor within a vehicle, cause the processor to distinguish between a tail light of another vehicle and a flashing red stop light by executing the steps comprising: controlling an imager to image a scene external and forward of the vehicle and generating image data corresponding to the acquired images; receiving and analyzing the image data in the processor to identify red light sources and further analyze each red light source to determine if the red light source is detected for a predetermined time period; if the red light source is not detected within a predetermined time period after it is detected, determining that the red light source is a flashing red stop light; and otherwise if the red light source is detected for a predetermined time period, determining that the red light source may be a tail light of another vehicle.

These and other features, advantages, and objects of the present invention will be further understood and appreciated by those skilled in the art by reference to the following specification, claims, and appended drawings.

BRIEF DESCRIPTION OF THE DRAWINGS

The present invention will be more fully understood from the detailed description and the accompanying drawings, wherein.

DETAILED DESCRIPTION OF THE PREFERRED EMBODIMENTS

Reference will now be made in detail to the present preferred embodiments, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to an imaging system for a vehicle and a method of detecting and/or categorizing objects in a scene forward of the vehicle. To assist in the understanding of an application of these embodiments, examples are provided that pertain to the use of the imaging system in an exterior light control system for controlling exterior lights of a controlled vehicle in response to image data acquired from an image sensor, which captures images forward of the vehicle. Prior systems are known for controlling exterior vehicle lights in response to images captured forward of the vehicle. In these prior systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high-beam state (or some state other than a low-beam state). If a vehicle was present in the glare area, the controller would respond by changing the state of the exterior lights so as to not cause glare for the other driver(s). Examples of such systems are described in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, 8,120,652, and 8,543,254, the entire disclosures of which are incorporated herein by reference.

One of the challenges for such systems is to distinguish lights from other vehicles and nonvehicle light sources. If the system were unable to accurately make such distinctions, it would respond to detection of a nonvehicle light source in the same way it would respond to an oncoming or leading vehicle and would reduce its lighting level when it does not need to be reduced. Such unnecessary reduction in lighting levels can be a distraction and a nuisance to the driver. Current systems analyze a number of different characteristics of each light source including brightness, size, shape, location, motion, AC modulation, etc. to compute a probability that a light source is a headlight or tail light of another vehicle.

One particular nonvehicle light source that current systems sometimes do not readily distinguish from vehicle tail lights is a flashing red stop light. As a result, the system will often turn off high beams or otherwise reduce illumination levels upon detecting a flashing red stop light at a considerably greater distance than is necessary. Accordingly, the embodiments described herein are provided to better distinguish a flashing red stoplight from vehicle tail lights such that the system will not reduce the illumination level of the exterior vehicle lights until the vehicle is within 100 meters of the stop light or even within 50 meters of the stop light.

To detect that a light is a red flashing light, the system analyzes the image data and identifies a red light source, which at this point may be a tail light or a red flashing light. Because the frequency at which red flashing stop lights flash is governed by law and therefore known, the system may then determines whether the identified red light source is flashing at the known frequency. The specific manner by which the system may perform this function is described further below following a description of an example of the basic structure of the system.

Figure 1:
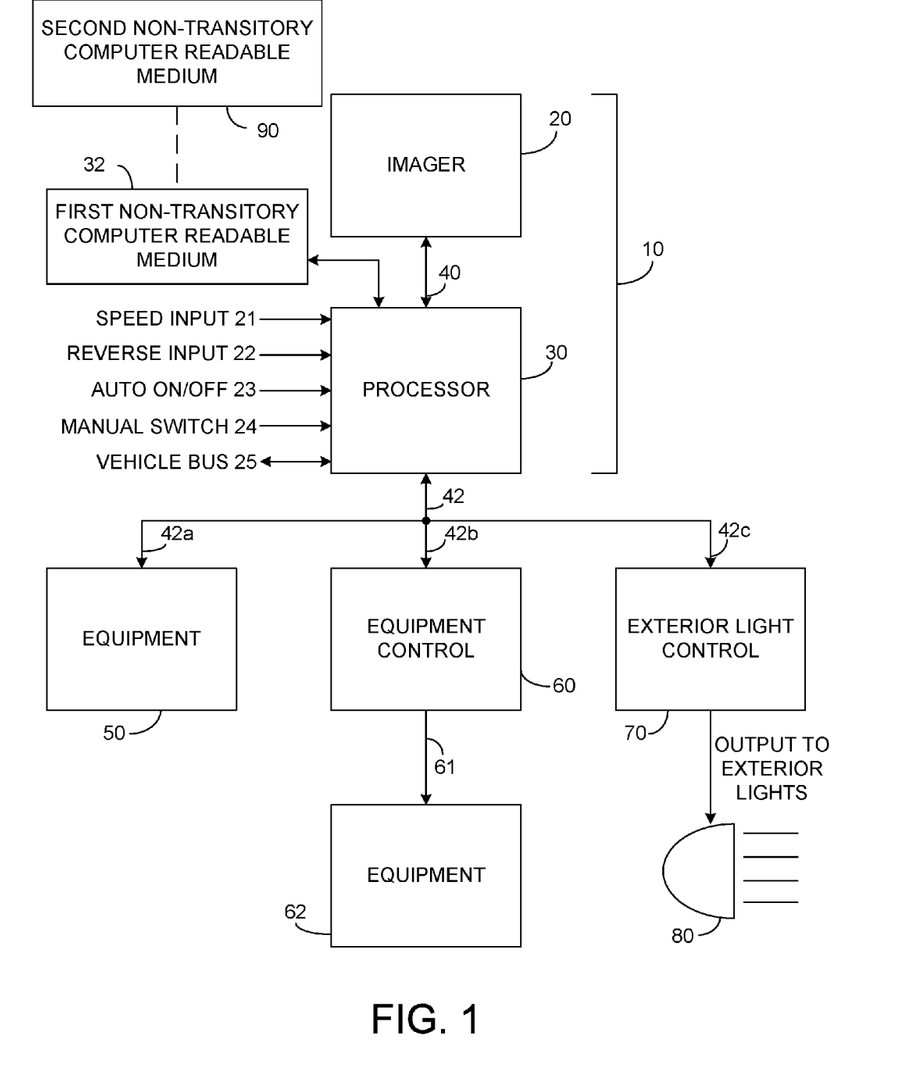
FIG. 1 is a block diagram of a system constructed according to one embodiment.

A first embodiment of an imaging system 10 is shown in FIG. 1. Imaging system 10 may be provided for controlling exterior lights 80 and, optionally, other equipment (50, 62) of a vehicle. System 10 includes an imager 20 and a processor 30. Imager 20 includes an image sensor (201, FIG. 2) that is configured to image a scene external and forward of the vehicle and to generate image data corresponding to the acquired images. Processor 30 receives and analyzes the image data to detect objects in the forward scene, and wherein the analysis of the image data performed by processor 30 may further include categorizing objects detected in the image data. If used in an exterior light control system, processor 30 may generate an exterior light control signal that may be used to control exterior lights 80 and may generate control signals to control any additional equipment (50, 62). These control signals are generated in response to analysis of the image data.

If imaging system 10 is used in a vehicle equipment control system, processor 30 may be configured to directly connect to the equipment (50) being controlled such that the generated control signals directly control the equipment. Alternatively, processor 30 may be configured to connect to an equipment control (60 and 70), which, in turn, is connected to the equipment being controlled (62 and 80) such that the control signals generated by processor 30 only indirectly control the equipment. For example, in the case of the equipment being exterior lights 80, processor 30 may analyze the image data from imager 20 so as to generate control signals that are more of a recommendation for an exterior light control 70 to use when controlling exterior lights 80. Thus, it can be said that the control signals are used to control the equipment. The control signals may further include not just a recommendation, but also a code representing a reason for the recommendation so that equipment controls 60 and 70 may determine whether or not to override a recommendation.

As shown in FIG. 1, various inputs (such as inputs 21-24) may be provided to processor 30 that may be taken into account in analyzing the image data or forming a recommendation or direct control signal. In some cases, such inputs may instead be provided to equipment control (60 and 70). For example, input from manual switches may be provided to equipment control (60 and 70), which may allow equipment control (60 and 70) to override a recommendation from processor 30. It will be appreciated that various levels of interaction and cooperation between processor 30 and equipment controls (60 and 70) may exist. One reason for separating control functions is to allow imager 20 to be located in the best location in the vehicle for obtaining images, which may be a distance from the equipment to be controlled and to allow communication over the vehicle bus 25.

According to one embodiment, the equipment that imaging system 10 can control may include one or more exterior lights 80 and the control signal generated by processor 30 may be an exterior light control signal. In this embodiment, exterior lights 80 may be controlled directly by processor 30 or by an exterior light control 70, which receives a control signal from processor 30. As used herein, the "exterior lights" broadly include any exterior lighting on the vehicle. Such exterior lights may include headlamps (both low and high beam if separate from one another), tail lights, foul weather lights (such as fog lights), brake lights, center-mounted stop lights (CHMSLs), turn signals, and back-up lights, etc. The exterior lights may be operated in several different modes including conventional low-beam and high-beam states. They may also be operated as daytime running lights, and additionally as super-bright high beams in those countries where they are permitted.

The brightness of the exterior lights may also be continuously varied between the low, high, and super-high states. Separate lights may be provided for obtaining each of these exterior lighting states or the actual brightness of the exterior lights may be varied to provide these different exterior lighting states. In either case, the "perceived brightness" or illumination pattern of the exterior lights is varied. As used herein, the term "perceived brightness" means the brightness of the exterior lights as perceived by an observer outside the vehicle. Most typically, such observers will be drivers or passengers in a preceding vehicle or in a vehicle traveling along the same street in the opposite direction. Ideally, the exterior lights are controlled such that if an observer is located in a vehicle within a "glare area" relative to the vehicle (i.e., the area in which the observer would perceive the brightness of the exterior lights as causing excessive glare), the beam illumination pattern is varied such that the observer is no longer in the glare area. The perceived brightness and/or glare area of the exterior lights may be varied by changing the illumination output of one or more exterior lights, by steering one or more lights to change the aim of one or more of the exterior lights, selectively blocking or otherwise activating or deactivating some or all of the exterior lights, altering the illumination pattern forward of the vehicle, or a combination of the above.

Imager 20 may be any conventional imager. Examples of suitable imagers are disclosed in published United States Patent Application Publication Nos. US 20080192132 A1 and US 20120072080 A1, and in U.S. Provisional Application Nos. 61/500,418 entitled "MEDIAN FILTER" filed on Jun. 23, 2011, by Jon H. Bechtel et al.; 61/544,315 entitled "MEDIAN FILTER" and filed on Oct. 7, 2011, by Jon H. Bechtel et al.; and 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

The imager includes an image sensor (or camera) to capture images that may then be displayed and/or analyzed in order to detect and optionally categorize objects or to optionally control vehicle equipment such as exterior lights. For example, such imagers have been used for lane departure warning systems, forward collision warning systems, adaptive cruise control systems, pedestrian detection systems, night vision systems, terrain detection systems, parking assist systems, traffic sign recognition systems, and reverse camera display systems. Examples of systems using imagers for such purposes are disclosed in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and in U.S. Provisional Application Nos. 61/512,213 entitled "RAISED LANE MARKER DETECTION SYSTEM AND METHOD THEREOF" and filed on Jul. 27, 2011, by Brock R. Rycenga et al., and 61/512,158 entitled "COLLISION WARNING SYSTEM AND METHOD THEREOF" and filed on Jul. 27, 2011, by Brock R. Rycenga et al., which together correspond to published United States Patent Application Publication No. US 2013/0028473 A1, the entire disclosures of which are incorporated herein by reference.

In the example shown in FIG. 1, imager 20 may be controlled by processor 30. Communication of imager parameters as well as image data occurs over communication bus 40, which may be a bi-directional serial bus, parallel bus, a combination of both, or other suitable means. Processor 30 may perform equipment control functions by analyzing images from imager 20, determining an equipment (or exterior light) state based upon information detected within those images, and communicating the determined equipment (or exterior light) state to the equipment 50, equipment control 60, or exterior light control 70 through bus 42, which may be the vehicle bus 25, a CAN bus, a LIN bus or any other suitable communication link. Processor 30 may control the imager to be activated in several different modes with different exposure times and different readout windows. Processor 30 may be used to both perform the equipment or exterior light control function and control the parameters of imager 20.

Processor 30 can also take advantage of the availability of signals (such as vehicle speed and yaw) communicated via discrete connections or over the vehicle bus 25 in making decisions regarding the operation of the exterior lights 80. In particular, speed input 21 provides vehicle speed information to the processor 30 from which speed can be a factor in determining the control state for the exterior lights 80 or other equipment. The reverse signal 22 informs processor 30 that the vehicle is in reverse, responsive to which the processor 30 may clear an electrochromic mirror element regardless of signals output from light sensors. Auto ON/OFF switch input 23 is connected to a switch having two states to dictate to processor 30 whether the vehicle exterior lights 80 should be automatically or manually controlled. The auto ON/OFF switch (not shown) connected to the ON/OFF switch input 23 may be incorporated with the headlamp switches that are traditionally mounted on the vehicle dashboard or incorporated into steering wheel column levels. Manual dimmer switch input 24 is connected to a manually actuated switch (not shown) to provide a manual override signal for an exterior light control state. Some or all of the inputs 21, 22, 23, 24 and outputs 42a, 42b, and 42c, as well as any other possible inputs or outputs, such as a steering wheel input, can optionally be provided through vehicle bus 25 shown in FIG. 1. Alternatively, these inputs 21-24 may be provided to equipment control 60 or exterior light control 70.

Processor 30 can control or interact with, at least in part, other equipment 50 within the vehicle which is connected to processor 30 via vehicle bus 42. Specifically, the following are some examples of one or more equipment 50 that may be controlled by processor 30: exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system such as a digital signal processor-based voice actuation system, a vehicle speed control, interior lights, rearview mirrors, an audio system, an engine control system, and various other switches and other display devices that may be located throughout the vehicle.

In addition, processor 30 may be, at least in part, located within a rearview assembly of a vehicle or located elsewhere within the vehicle. The processor 30 may also use a second processor (or processors) such as equipment control 60, which may be located in a rearview assembly or elsewhere in the vehicle in order to control certain kinds of equipment 62. Equipment control 60 can be connected to receive via vehicle bus 42 control signals generated by processor 30. Equipment control 60 subsequently communicates and controls equipment 62 via bus 61. For example, equipment control 60 may be a windshield wiper control unit which controls windshield wiper equipment, turning this equipment ON or OFF. Equipment control may also be an electrochromic mirror control unit where processor 30 is programmed to communicate with the electrochromic control unit in order for the electrochromic control unit to change the reflectivity of the electrochromic mirror(s) in response to information obtained from an ambient light sensor, a glare sensor, as well as any other components coupled to the processor. Specifically, equipment control unit 60 in communication with processor 30 may control the following equipment: exterior lights, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry, a telemetry system, a voice recognition system such as a digital signal processor-based voice actuation system, a vehicle speed warning, interior lights, rearview mirrors, an audio system, a climate control, an engine control, and various other switches and other display devices that may be located throughout the vehicle.

Figure 2:
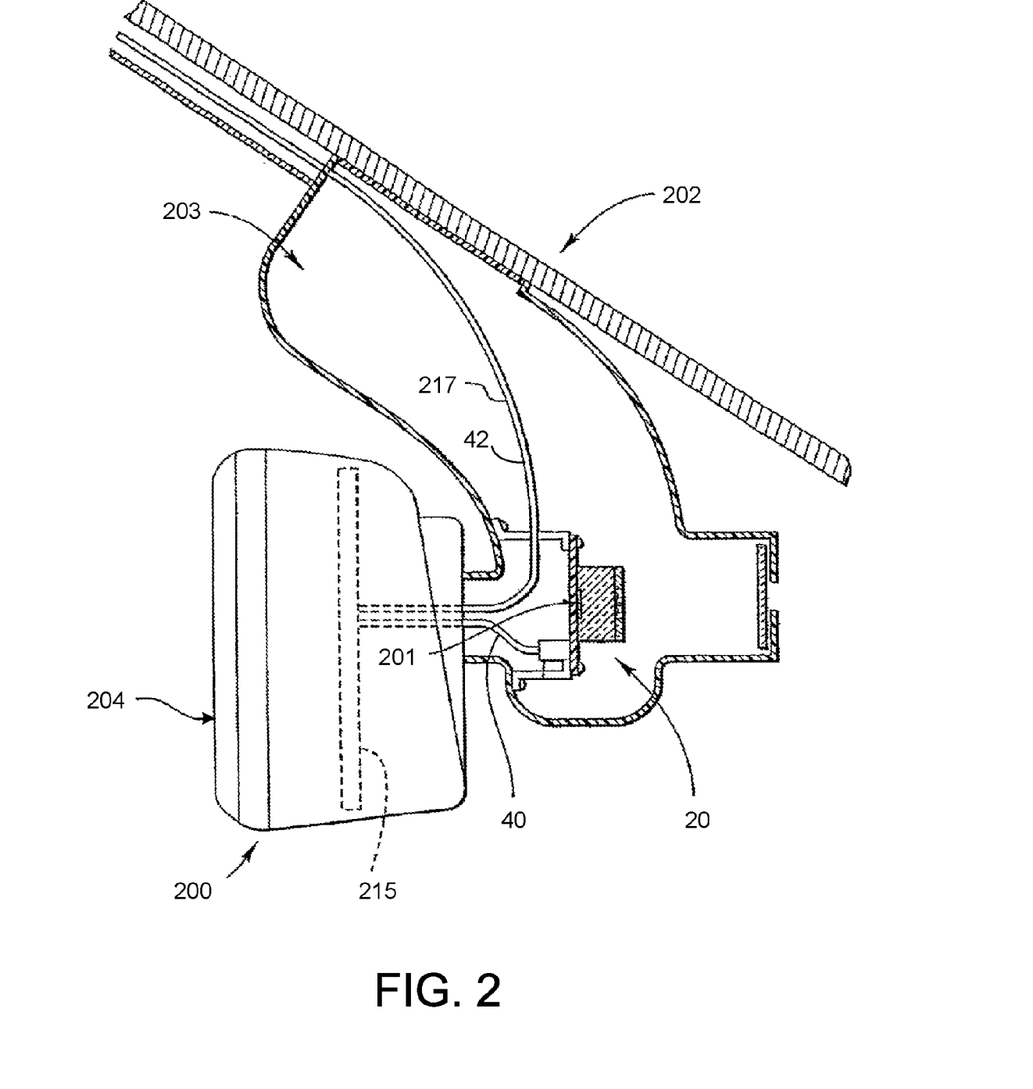
FIG. 2 is a partial cross section of a rearview assembly incorporating the system of FIG. 1.

Portions of imaging system 10 can be advantageously integrated into a rearview assembly 200 as illustrated in FIG. 2, wherein imager 20 is integrated into a mount 203 of rearview assembly 200. This location provides an unobstructed forward view through a region of the windshield 202 of the vehicle that is typically cleaned by the vehicle's windshield wipers (not shown). Additionally, mounting the image sensor 201 of imager 20 in the rearview assembly permits sharing of circuitry such as the power supply, microcontroller and light sensors.

Referring to FIG. 2, image sensor 201 is mounted within rearview mount 203, which is mounted to vehicle windshield 202. The rearview mount 203 provides an opaque enclosure for the image sensor with the exception of an aperture through which light is received from a forward external scene.

Processor 30 of FIG. 1 may be provided on a main circuit board 215 and mounted in rearview housing 204 as shown in FIG. 2. As discussed above, processor 30 may be connected to imager 20 by a bus 40 or other means. The main circuit board 215 may be mounted within rearview housing 204 by conventional means. Power and a communication link 42 with the vehicle electrical system, including the exterior lights 80 (FIG. 1), are provided via a vehicle wiring harness 217 (FIG. 2).

Rearview assembly 200 may include a mirror element or a display that displays a rearward view. The mirror element may be a prismatic element or an electro-optic element, such as an electrochromic element.

Additional details of the manner by which imaging system 10 may be integrated into a rearview mirror assembly 200 are described in U.S. Pat. No. 6,611,610, the entire disclosure of which is incorporated herein by reference. Alternative rearview mirror assembly constructions used to implement exterior light control systems are disclosed in U.S. Pat. No. 6,587,573, the entire disclosure of which is incorporated herein by reference.

The method for distinguishing between vehicle tail lights and flashing red stop lights will now be described with reference to FIGS. 3A, 3B, and 4. This method is described below as being implemented by processor 30 using image data received from imager 20. This method may be a subroutine executed by any processor, and thus this method may be embodied in a non-transitory computer readable medium having stored thereon software instructions that, when executed by a processor, cause the processor to control the equipment of the controlled vehicle, by executing the steps of the method described below. In other words, aspects of the inventive method may be achieved by software stored on a non-transitory tangible computer readable medium or software modifications or updates to existing software residing in a non-transitory computer readable medium. Such software or software updates may be downloaded into a first non-transitory computer readable media 32 of processor 30 (or locally associated with processor 30 or some other processor) typically prior to being installed in a vehicle, from a second non-transitory computer readable media 90 located remote from first non-transitory computer readable media 32. Second non-transitory computer readable media 90 may be in communication with first non-transitory computer readable media 32 by any suitable means, which may at least partially include the Internet or a local or wide area wired or wireless network.

Figure 3:
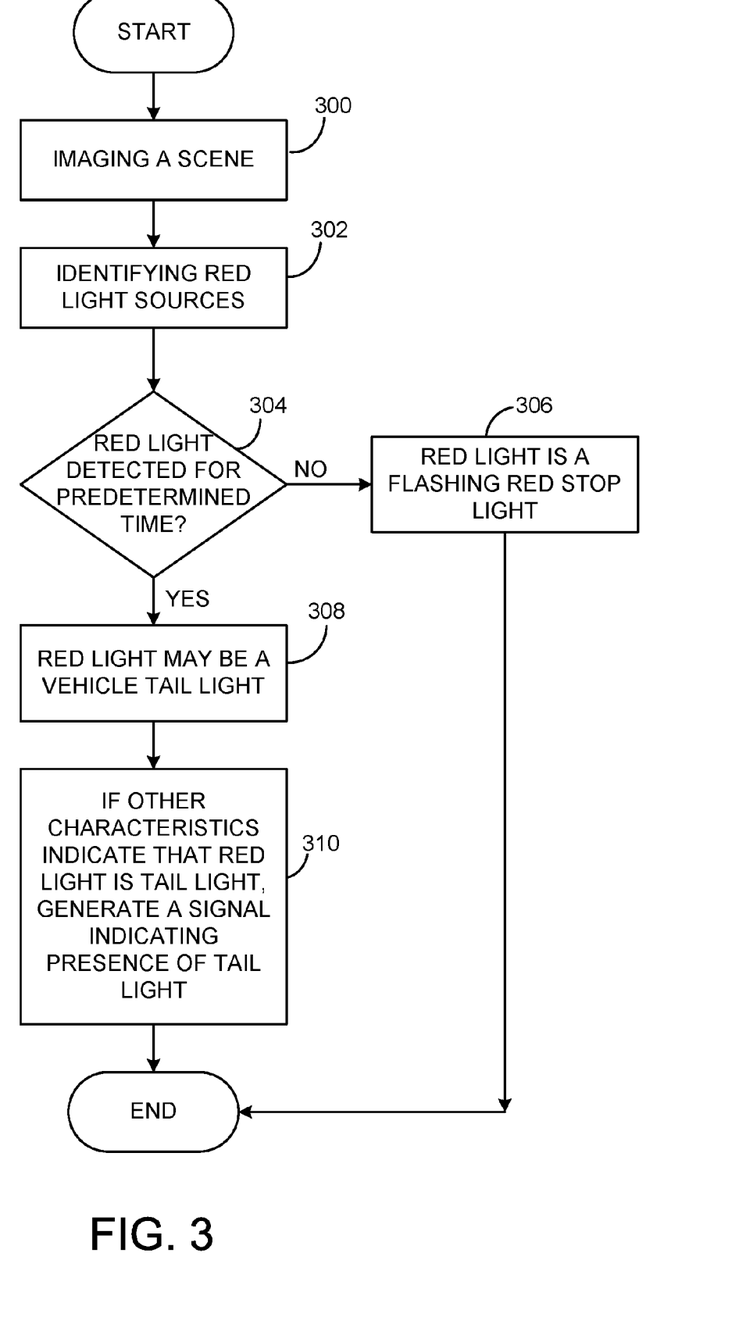
FIG. 3 is a flow chart illustrating the steps of a method for distinguishing between vehicle tail lights of another vehicle and a flashing red stop lamp.

FIG. 3 shows a flow chart of the steps of the method for distinguishing between vehicle tail lights and flashing red stop lights that may be executed by processor 30 when interacting with imager 20. The method begins with imaging a scene external and forward of the vehicle and generating image data corresponding to the acquired images (step 300). Next, processor 30 receives and analyzes the image data to identify red light sources (step 302) and further analyzes each red light source to determine if the red light source is detected for a predetermined time period (step 304). If the red light source is not detected within a predetermined time period after it is detected (about one second), processor 30 determines that the red light source is a flashing red stop light (step 306). Otherwise, if the red light source is detected for a predetermined time period, processor 30 determines that the red light source may be a tail light of another vehicle (step 308). If the imaging system is used to control vehicle equipment, such as exterior lights, processor 30 may execute the optional step of generating a signal indicating the presence of a vehicle tail light if other characteristics of the red light source indicate that the red light source is a vehicle tail light. Such other characteristics may include any known characteristics such as motion and brightness, for example. Optionally, processor 30 may be configured to determine that the red light source is a flashing red stop light when it is detected periodically and is not detected within the predetermined time period following a period of detection. The frames of image data may be captured at a predetermined image capture rate and the step of determining whether the red light source is a flashing red stop light includes determining whether the red light source is not detected within a predetermined number of frames acquired after a frame in which the red light source is detected, wherein the predetermined number of frames corresponds to the predetermined time period multiplied by the predetermined image capture rate. Processor 30 may further be configured to generate a signal indicating that an illumination level of the exterior lights should be reduced when a brightness of a red flashing stop light exceeds a brightness threshold. An example of this method is further described below with respect to FIGS. 4A and 4B.

Figure 4A:
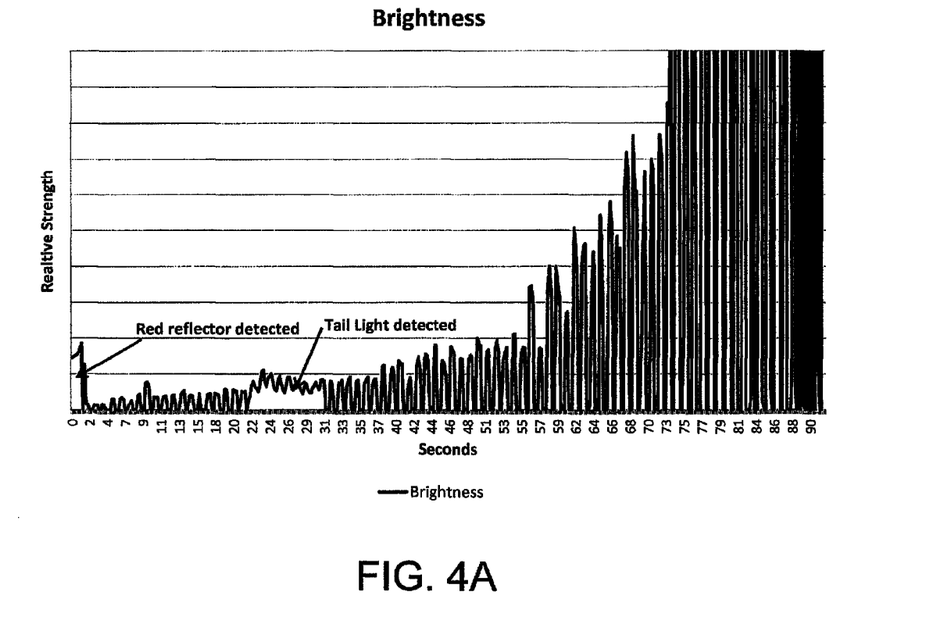
FIG. 4A is a graphic illustration of an example of red light intensity that may be detected over a number of frames as the controlled vehicle approaches a flashing red stop light.

FIG. 4A shows a graphic illustration of the intensity of red light detected as the vehicle approaches a red flashing stop light. The horizontal scale is the number of seconds of image data that has been captured. FIG. 4B shows the state of the high beam headlamps for the same time period as shown in FIG. 4A. As illustrated in FIG. 4B, the high beams are initially turned on, but turned off upon detecting a bright red reflector. Because the detected light from the reflector is significantly reduced upon turning off the high beams, the processor determines that the bright red reflected light was that from a reflector and the processor returns the high beams to an ON state.

As shown through the graph in FIG. 4A, a pulsing red light is detected of increasing intensity. Between each pulse, however, the detected brightness returns to zero on a periodic basis. The frequency at which flashing red stop lights flash is typically within a certain legally specified limit. Thus, processor 30 can detect that a pulsing red light is in fact a stop light upon determining that the pulsing red light is pulsing at a frequency corresponding to that of a stop light.

Frames of image data are captured at a predetermined image capture rate of, for example, five frames per second (one frame captured every 200 milliseconds). Thus, if a red light is initially detected and then not detected within a predetermined number of frames (e.g., about four frames) thereafter, processor 30 can determine that the pulsing red light is a flashing red stop light. Given the known image capture rate, the predetermined number of frames is selected to correspond to a predetermined time period in which one would expect a stop light to turn on and then off based on the known frequency at which such stop lights flash.

Accordingly, referring back to FIG. 4A, processor 30 would determine that the pulsing red light appearing throughout the window of second 3 to second 23 is a stop light and therefore would not generate a control signal to have the high beams turned off. Thus, the high beams remain on as shown in FIG. 4B. However, at about second 23, a tail light of another vehicle is detected where the brightness of which is superimposed with that of the stop lamp in the graph of FIG. 4A where it is labeled "Tail Light detected."

Figure 4B:
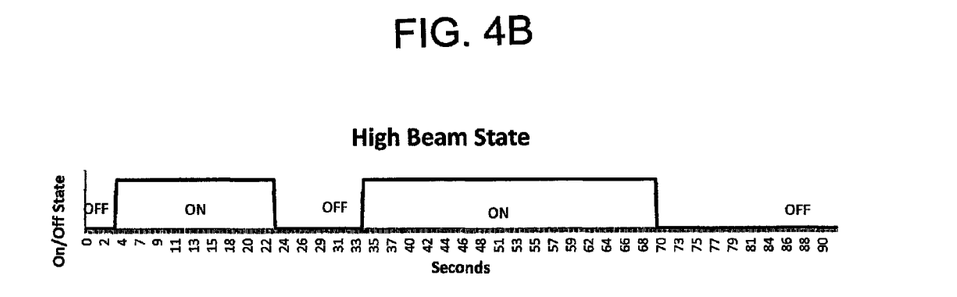
FIG. 4B is a graphic illustration of the state of the high beam headlamps as changed in response to the detected red light intensity shown in the example in FIG. 4A.

Because the value of red light detected does not drop to zero within a predetermined number of frames or seconds, processor 30 may determine that a tail light of a vehicle may be present and therefore generate a control signal indicating such presence which causes the high beams to be turned off as shown in FIG. 4B.

Next, around frame 31, the tail light is no longer present and the value of red light detected again periodically drops to zero. Therefore, processor 30 determines that no vehicles are currently present and that the red light is from a stop light, and thus generates a control signal to turn the high beams back on. As shown in FIG. 4B, the high beams then remain on until the brightness of the stop light exceeds a brightness threshold (at about 70 seconds, at which point, processor 30 determines that the controlled vehicle has neared the intersection where the stop light is located and then generates a control signal to turn the high beams off). The control signal may include an indication that the basis for the command is an approaching intersection. Preferably, processor 30 causes the high beams to turn off within 100 meters of the red flashing stop light, more preferably within 50 meters. Based on simulations, the above described embodiment is capable of turning off the high beams within 50 meters of the red flashing stop light.

It should be noted that processor 30 is capable of determining that a flashing red light is a stop light as opposed to just some nonvehicle light. If processor 30 determined that such a flashing red light was just a nonvehicle light source, processor 30 would not necessarily know to turn off the high beams as the brightness increased. Nevertheless, when supplied with vehicle speed data, processor 30 may turn off the high beams when the vehicle speed falls below a threshold.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An imaging system for a vehicle, comprising:
   an imager configured to acquire one or more images of a scene external and forward of the vehicle and to generate image data corresponding to the one or more acquired images; and
   a processor configured to receive and analyze the image data to detect one or more red light sources and to further analyze each detected red light source to determine if each respective red light source is detected for a predetermined time period,
   based on a determination that the respective red light source is not detected for the predetermined time period, the processor is further configured to: (i) determine that the respective red light source is a flashing red stop light, and (ii) generate a signal indicating that an illumination level of exterior lights of the vehicle should be reduced when a brightness of the flashing red stop light exceeds a brightness threshold regardless of an absence of any other vehicles in the imaged scene.

2. The imaging system of claim 1, wherein the processor is further configured to, based on the determination that the respective red light source may be a tail light of another vehicle, generate a signal indicating the presence of another vehicle.

3. The imaging system of claim 1, wherein the predetermined time period is about one second.

4. The imaging system of claim 1, wherein the processor is further configured to determine that the respective red light source is a flashing red stop light based on detecting the respective red light source periodically and not detecting the respective red light source for the predetermined time period.

5. The imaging system of claim 1, wherein the imager is configured to acquire one or more images by capturing frames of image data at a predetermined image frame capture rate; and
   wherein the processor is configured to determine that the respective red light source is a flashing red stop light based on not detecting the respective red light source with a predetermined number of frames acquired after a frame in which the respective red light source is detected, the predetermined number of frames corresponding to the predetermined time period multiplied by the predetermined image capture rate.

6. A method for distinguishing between tail lights of another vehicle and a flashing red stop light, comprising:
   providing an imager for use in a vehicle;
   imaging a scene external and forward of the vehicle and generating image data corresponding to the acquired images;
   receiving and analyzing the image data in a processor to identify red light sources and further analyze each red light source to determine if the red light source is detected for a predetermined time period;
   if the red light source is not detected within the predetermined time period, determining that the red light source is a flashing red stop light and generating a signal indicating that an illumination level of the exterior lights should be reduced when a brightness of the flashing red stop light exceeds a brightness threshold regardless of an absence of any other vehicles in the imaged scene; and
   otherwise if the red light source is detected for the predetermined time period, determining that the red light source may be a tail light of another vehicle.

7. The method of claim 6, and further comprising generating a control signal that is used to control exterior lights of the vehicle in which the imaging system is used in response to analysis of the image data, wherein, when generating a control signal, indicating the presence of another vehicle if a tail light of the other vehicle is detected.

8. The method of claim 6, wherein the predetermined time period is about one second.

9. The method of claim 6, wherein the step of determining that the red light source is a flashing red stop light includes determining whether the red light source is detected periodically and is not detected within the predetermined time period.

10. The method of claim 6, wherein frames of image data are captured at a predetermined image capture rate and the step of determining whether the red light source is a flashing red stop light includes determining whether the red light source is not detected within a predetermined number of frames acquired after a frame in which the red light source is detected, wherein the predetermined number of frames corresponds to the predetermined time period multiplied by the predetermined image capture rate.

11. A non-transitory tangible computer readable medium having stored thereon software instructions that, when executed by a processor within a vehicle, cause the processor to distinguish between tail lights of another vehicle and a flashing red stop light, by executing the steps comprising:

controlling an imager to image a scene external and forward of the vehicle and generating image data corresponding to the acquired images;

receiving and analyzing the image data in the processor to identify red light sources and further analyzing each red light source to determine if the red light source is detected for a predetermined time period;

if the red light source is not detected within the predetermined time period, determining that the red light source is a flashing red stop light and generating a signal that indicates that an illumination level of the exterior lights should be reduced when a brightness of the flashing red stop light exceeds a brightness threshold regardless of an absence of any other vehicles in the imaged scene; and otherwise if the red light source is detected for the predetermined time period, determining that the red light source may be a tail light of another vehicle.

12. The non-transitory tangible computer readable medium of claim 11, wherein the software instructions cause the processor to generate a control signal that is used to control exterior lights of the vehicle in which the imaging system is used, in response to analysis of the image data, and when generating a control signal, to indicate the presence of another vehicle if a tail light of the other vehicle is detected.

13. The non-transitory tangible computer readable medium of claim 11, wherein the predetermined time period is about one second.

14. The non-transitory tangible computer readable medium of claim 11, wherein the step of determining that the red light source is a flashing red stop light includes determining whether the red light source is detected periodically and is not detected within the predetermined time period.

15. The non-transitory tangible computer readable medium of claim 11, wherein frames of image data are captured at a predetermined image capture rate and the step of determining whether the red light source is a flashing red stop light includes determining whether the red light source is not detected within a predetermined number of frames acquired after a frame in which the red light source is detected, wherein the predetermined number of frames corresponds to the predetermined time period multiplied by the predetermined image capture rate.

16. The non-transitory tangible computer readable medium of claim 11, wherein the brightness threshold is selected such that the signal is generated when a distance to the flashing red stop light is within at least about 50 meters.

17. The imaging system of claim 1, wherein the brightness threshold is selected such that the signal is generated when a distance to the flashing red stop light is within at least about 50 meters.

18. The method of claim 6, wherein the brightness threshold is selected such that the signal is generated when a distance to the flashing red stop light is within at least about 50 meters.

19. The imaging system of claim 1, wherein, based on a determination that the respective red light source is detected for the predetermined time period, the processor is further configured to determine that the respective red light source may be a tail light of another vehicle.

\* \* \* \* \*